(12) United States Patent
Anand et al.

(10) Patent No.: US 8,930,670 B2
(45) Date of Patent: Jan. 6, 2015

(54) PARTITION REDISPATCHING USING PAGE TRACKING

(75) Inventors: Vaijayanthimala K. Anand, Austin, TX (US); Bret R. Olszewski, Austin, TX (US); Mysore Sathyanarayana Srinivas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1983 days.

(21) Appl. No.: 11/936,456

(22) Filed: Nov. 7, 2007

(65) Prior Publication Data

US 2009/0119474 A1 May 7, 2009

(51) Int. Cl.
*G06F 12/06* (2006.01)
*G06F 12/10* (2006.01)

(52) U.S. Cl.
CPC ...... *G06F 12/1009* (2013.01); *G06F 2212/401* (2013.01)
USPC ........................................................ 711/173

(58) Field of Classification Search
USPC ........................................................ 711/173
See application file for complete search history.

(56) References Cited

U.S. PATENT DOCUMENTS

| 4,562,539 A | * | 12/1985 | Vince | 709/214 |
| 5,765,157 A | * | 6/1998 | Lindholm et al. | 1/1 |
| 2006/0026383 A1 | * | 2/2006 | Dinechin et al. | 711/207 |

OTHER PUBLICATIONS

Anand et al. U.S. Appl. No. 11/617,206, filed Dec. 28, 2006.

* cited by examiner

*Primary Examiner* — Kenneth Lo
(74) *Attorney, Agent, or Firm* — Damion Josephs; Yee & Associates, P.C.

(57) ABSTRACT

Illustrated embodiments provide a computer implemented method and data processing system for redispatching a partition by tracking a set of memory pages, belonging to the dispatched partition. In one illustrative embodiment the computer implemented method comprises finding an effective page address to real page address mapping for a page address miss in response to determining the page address miss in a page addressing buffer, and saving the mapping as an entry in an array. The computer implemented method creates a preserved array from the array in response to determining the dispatched partition to be an undispatched partition. The computer implemented method further analyzes of the preserved array for a compressed page in response to determining the undispatched partition is now redispatched, and decompresses the compressed page prior to the partition being redispatched.

20 Claims, 3 Drawing Sheets

PARTITION REDISPATCHING USING PAGE TRACKING

BACKGROUND OF THE INVENTION

1. Field of the Invention

The present invention relates generally to paging subsystems of a data processing system. More specifically, the present invention relates to a computer implemented method and data processing system for partition redispatching using page tracking.

2. Description of the Related Art

Increasingly, large symmetric multi-processor data processing systems are not being used as single large data processing systems. Instead, these types of data processing systems are being partitioned and used as smaller systems. These systems are also referred to as logical partitioned (LPAR) data processing systems. A logical partitioned functionality within a data processing system allows multiple copies of a single operating system, or multiple heterogeneous operating systems, to be simultaneously run on a single data processing system platform. A partition, within which an operating system image runs, may be assigned a non-overlapping subset of the platforms resources. These platform allocable resources include one or more architecturally distinct processors and respective interrupt management areas, regions of system memory, and input/output (I/O) adapter bus slots. The partition's resources are represented by the platform's firmware to the operating system image.

Each distinct operating system, or image of an operating system running within a platform, is protected from each other, such that software errors on one logical partition cannot affect the correct operation of any of the other partitions. This protection is provided by allocating a disjointed set of platform resources to be directly managed by each operating system image and by providing mechanisms for ensuring that the various images cannot control any resources that have not been allocated to that image. Furthermore, software errors in the control of an operating system's allocated resources are prevented from affecting the resources of any other image. Thus, each image of the operating system or each different operating system directly controls a distinct set of allocable resources within the platform.

With respect to hardware resources in a logical partitioned data processing system, these resources are shared disjointly among various partitions. These resources may include, for example, input/output (I/O) adapters, dual in-line memory modules (DIMMs), non-volatile random access memory (NVRAM), and hard disk drives. Each partition within a logical partitioned data processing system may be booted and shut down over and over without having to power-cycle the entire data processing system.

Most computers have a fixed memory and processor capacity. The virtualization of processors allows more operating system instances, or partitions, in a system than there are processors. This, in turn, tends to increase the memory required to run all of the partitions, as operating systems and applications have certain minimum memory requirements that do not tend to scale with processor power. This imbalance limits the effective number of partitions that a given system can support at any point in time.

Traditionally, virtual memory has been one solution to this problem. Virtual memory is a technique by which some of the memory used by a partition is actually on disk. Unfortunately, disk paging virtual memory schemes suffer greatly from the fact that microprocessor performance has increased at a much faster rate than disk performance. This gap reduces the effectiveness of disk based virtual memory to a huge degree. In fact, most UNIX™ customers tune their systems to avoid paging at all costs.

Virtual memory can be employed in a partition management firmware in an attempt to decrease the effective memory usage of partitions. However, disk-based virtual memory approaches in a partition management firmware will typically suffer the same issues as operating system based virtual memory. Another, similar approach is to apply compression algorithms to memory. This approach was used on certain International Business Machines Corporation "system X" products in the past. A hardware-based approach to memory compression is elegant as it is mostly transparent to software; however, it requires building special purpose hardware to deliver the function.

Software based compression seems poised as an alternative approach to hardware based compression. In a software based compression approach, the partition management firmware selects pages for compression and decompression. The actual compression and decompression function can be delivered either through processor based code or with accelerators. An accelerator is special purpose hardware that is optimized for specific algorithms, wherein the function may be located on the microprocessor chip itself, or outside the microprocessor chip. Software-based compression has the benefit of lower complexity and cost of hardware, in that it takes advantage of the massive increases in microprocessor performance.

For example, most systems have a considerable number of unused processor cycles that could be applied to compression and decompression. Further, benefits accrue because software based compression can be used selectively, and the latency to decompress a page in memory is lower than going to disk. Once systems are graced with compression and decompression accelerators, the partition management firmware can begin to use software compression aggressively. For example, when a partition is undispatched, the memory it was using can be compressed in the background by the partition management firmware until the partition is dispatched again.

SUMMARY OF THE INVENTION

Illustrated embodiments provide a computer implemented method, apparatus and computer program product for partition redispatching using page tracking. The computer implemented method comprises finding an effective page address to real page address mapping for a page address miss to create a found real page address and page size combination, responsive to determining the page address miss in a page addressing buffer, and saving the found real page address and page size combination as an entry in an array. The computer implemented method further comprises creating a preserved array from the array, responsive to determining the dispatched partition to be an undispatched partition. The computer implemented method further comprises analyzing each entry of the preserved array for a compressed page, responsive to determining the undispatched partition is now redispatched, and invoking a partition management firmware function to decompress the compressed page, prior to the partition being redispatched, responsive to determining a compressed page.

The data processing system comprising, a bus, a storage device connected to the bus; a memory connected to the bus, wherein the memory includes computer usable program code, and a processor connected to the bus, wherein the processor executes the computer usable program code to create a locator responsive to detecting a page address miss in a page addressing buffer, capable of finding an effective page address to real page address mapping for the page address miss to form a found real page address and page size combination. Further creating a storage module capable of saving the found real page address and page size combination as an entry in set of entries in an array, and updating the set of entries in the array to track page use and a generator capable of creating a preserved array from the array in response to determining the partition to be an undispatched partition. Further creating an analyzer capable of analyzing each entry of the preserved array for a compressed page responsive to determining that the undispatched partition is redispatched, and a partition management firmware function to decompress a compressed page, prior to the partition being redispatched, responsive to determining a compressed page referenced by one of the set of entries in the array.

The computer program product comprising computer usable program code tangibly embodied on a computer usable recordable type medium, the computer usable program code comprising computer usable program code for detecting a page address miss in a page addressing buffer, computer usable program code for finding an effective page address to real page address mapping for the page address miss to form a found real page address and page size combination and computer usable program code for saving the found real page address and page size combination as an entry in a set of entries in an array. The computer usable program code further comprising computer usable program code for updating the set of entries in the array to track page use and computer usable program code for creating a preserved array from the array in response to determining the partition is an undispatched partition. The computer usable program code further comprising computer usable program code for analyzing each entry of the preserved array for a compressed page responsive to determining that the undispatched partition is now redispatched, and computer usable program code for invoking a partition management firmware function to decompress a compressed page, prior to the partition being redispatched, responsive to determining a compressed page referenced by one of the set of entries in the array.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
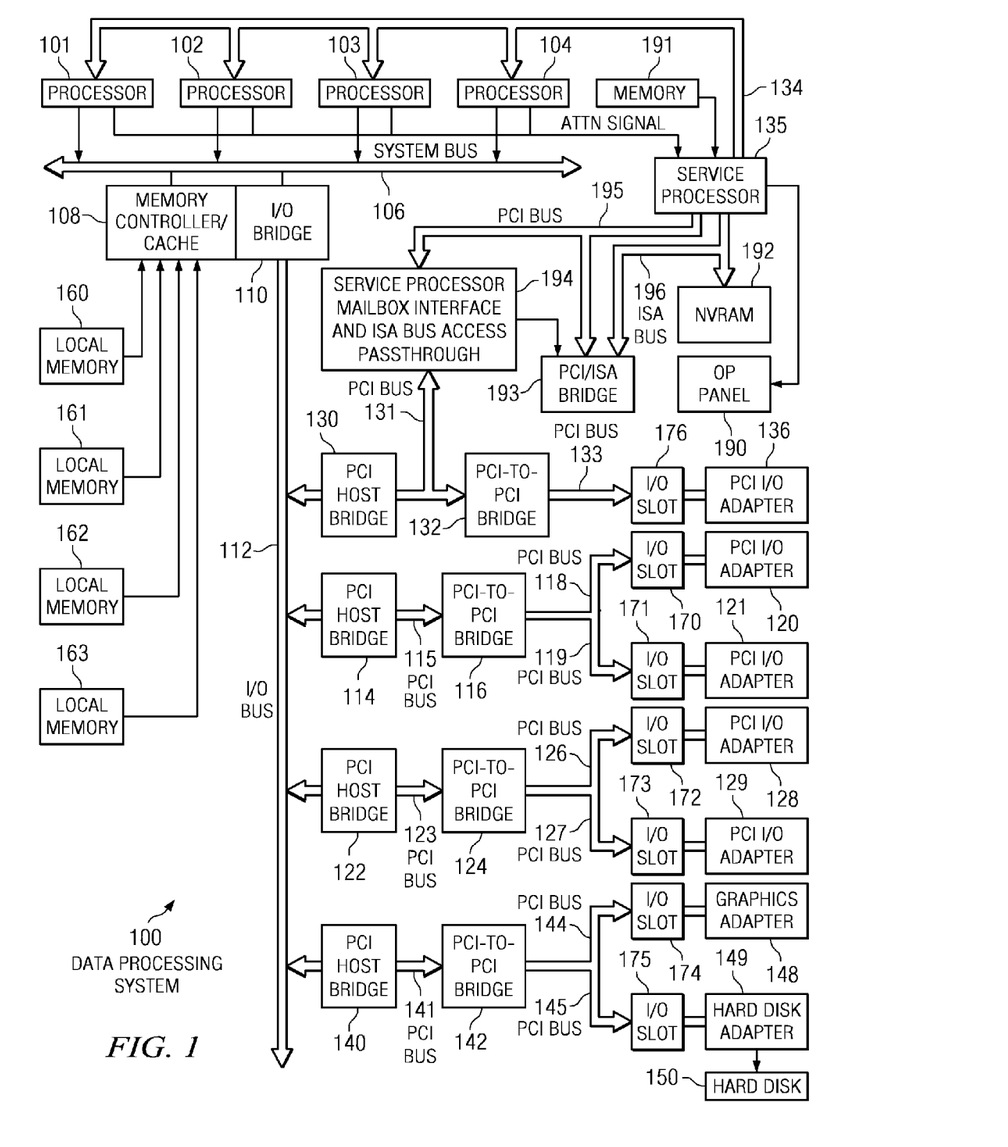
FIG. 1 is a block diagram of a data processing system in which illustrative embodiments may be implemented.

With reference now to the figures, and in particular with reference to FIG. 1, a block diagram of an apparatus in the form of a data processing system in which illustrative embodiments may be implemented is depicted. Data processing system 100 may be a symmetric multiprocessor (SMP) system including processors 101, 102, 103, and 104, which connect to system bus 106. For example, data processing system 100 may be an IBM® eserver™, a product of International Business Machines Corporation in Armonk, N.Y., implemented as a server within a network. Alternatively, a single processor system may be employed. Also connected to system bus 106 is memory controller/cache 108, which provides an interface to local memories 160, 161, 162, and 163. I/O bridge 110 connects to system bus 106 and provides an interface to I/O bus 112. Memory controller/cache 108 and I/O bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120, 121, 128, 129, and 136, graphics adapter 148, and hard disk adapter 149 may be assigned to different logical partitions. In this case, graphics adapter 148 connects to a display device (not shown), while hard disk adapter 149 connects to and controls hard disk 150.

Thus, for example, suppose data processing system 100 is divided into three logical partitions, P1, P2, and P3. Each of PCI I/O adapters 120, 121, 128, 129, and 136, graphics adapter 148, hard disk adapter 149, each of host processors 101, 102, 103, and 104, and memory from local memories 160, 161, 162, and 163 is assigned to each of the three partitions. In these examples, memories 160, 161, 162, and 163 may take the form of dual in-line memory modules. Dual in-line memory modules are not normally assigned on a per dual in-line memory module basis to partitions. Instead, a partition will get a portion of the overall memory seen by the platform. For example, processor 101, some portion of memory from local memories 160, 161, 162, and 163, and I/O adapters 120, 128, and 129 may be assigned to logical partition P1; processors 102 and 103, some portion of memory from local memories 160, 161, 162, and 163, and PCI I/O adapters 121 and 136 may be assigned to partition P2; and processor 104, some portion of memory from local memories 160, 161, 162, and 163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Linux or OS/400 operating system may be operating within logical partition P3.

Peripheral component interconnect (PCI) host bridge 114 connected to I/O bus 112 provides an interface to PCI local bus 115. PCI I/O adapters 120 and 121 connect to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 connects to a plurality of PCI I/O adapters 128 and 129. PCI I/O adapters 128 and 129 connect to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI bus 141.

A PCI host bridge 130 provides an interface for PCI bus 131 to connect to I/O bus 112. PCI I/O adapter 136 connects to I/O slot 176, which connects to PCI-to-PCI bridge 132 by PCI bus 133. PCI-to-PCI bridge 132 connects to PCI bus 131. This PCI bus also connects PCI host bridge 130 to the service processor mailbox interface and ISA bus access pass-through 194 and PCI-to-PCI bridge 132. Service processor mailbox interface and ISA bus access pass-through 194 forwards PCI accesses destined to the PCI/ISA bridge 193. NVRAM storage 192 connects to the ISA bus 196. Service processor 135 connects to service processor mailbox interface and ISA bus access pass-through logic 194 through its local PCI bus 195. Service processor 135 also connects to processors 101, 102, 103, and 104 via a plurality of JTAG/I²C busses 134. JTAG/I²C busses 134 are a combination of JTAG/scan busses (see IEEE 1149.1) and Phillips I²C busses. However, alternatively, JTAG/I²C busses 134 may be replaced by only Phillips I²C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I²C busses 134 to interrogate the system (host) processors 101, 102, 103, and 104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101, 102, 103, and 104, memory controller/cache 108, and I/O bridge 110. Any error information for failures detected during the BISTs, BATs, and memory tests are gathered and reported by service processor 135.

If a meaningful and valid configuration of system resources is still possible after taking out the elements found to be faulty during the BISTs, BATs, and memory tests, then data processing system 100 is allowed to proceed to load executable code into local (host) memories 160, 161, 162, and 163. Service processor 135 then releases host processors 101, 102, 103, and 104 for execution of the code loaded into local memory 160, 161, 162, and 163. While host processors 101, 102, 103, and 104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101, 102, 103, and 104, local memories 160, 161, 162, and 163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for de-configuration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries™ Model 840 system available from International Business Machines Corporation. Such a system may support logical partitioning using an OS/400™ operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to illustrative embodiments.

Figure 2:
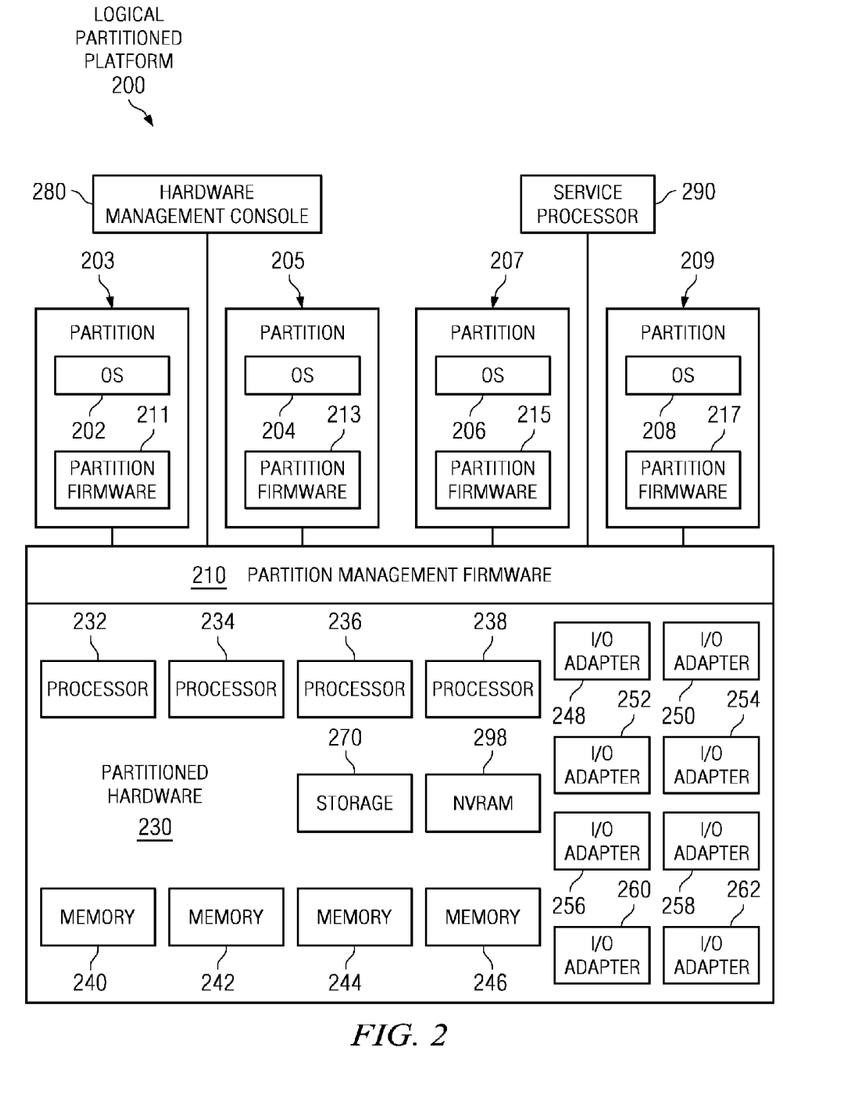
FIG. 2 is a block diagram of an exemplary logical partitioned platform in which illustrative embodiments may be implemented.

With reference now to FIG. 2, a block diagram of an exemplary logical partitioned platform is depicted in which illustrative embodiments may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200.

These operating systems may be implemented using OS/400, which are designed to interface with a partition management firmware, such as partition management firmware, which is available from International Business Machines Corporation. OS/400 is used only as an example in these illustrative embodiments. Of course, other types of operating systems, such as AIX™ and Linux™, may be used depending on the particular implementation. Operating systems 202, 204, 206, and 208 are located in partitions 203, 205, 207, and 209.

Partition management firmware software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software, which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and runtime abstraction software. The processors associated or assigned to the partitions are then dispatched to the partition's memory to execute the partition firmware.

Partitioned hardware 230 includes processors 232, 234, 236, and 238, memories 240, 242, 244, and 246, input/output (I/O) adapters 248, 250, 252, 254, 256, 258, 260, and 262, and a storage unit 270. Each of processors 232, 234, 236, and 238, memories 240, 242, 244, and 246, NVRAM storage 298, and I/O adapters 248, 250, 252, 254, 256, 258, 260, and 262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

Illustrative embodiments provide a capability to reduce the delay encountered by a partition when a previously accessed, recently used, page of memory has to be decompressed during the redispatch process. For example, with reference to partition 203 and partition management firmware 210 of logical partitioned platform 200 of FIG. 2, if partition 203 was executing but then had to wait for an input/output service to complete, partition management firmware 210 would have stopped partition 203, and changed the dispatch status to undispatched. After the input/output operation completed, partition management firmware 210 would mark partition 203 ready for execution again and eligible to be redispatched. During the redispatch process, resources needed by partition 203 would be made available by partition management firmware 210. Partition management firmware 210 would analyze the page memory requirements to dispatch partition 203. A subset of pages of memory, specifically those pages previously accessed, and recently used, by partition 203 would be decompressed prior to the redispatch to avoid a "stall" while partition 203 was being redispatched.

Illustrative embodiments provide a tracking mechanism to be used by partition management firmware in the form of an array, in a storage module or area such as memory 240-246 or NVRAM 298; containing real page addresses of the most recently used (MRU) pages for the microprocessor. Before the respective partition is to be redispatched, the partition management firmware begins to decompress the previously accessed pages recorded as most recently used by the partition. The decompress function can occur before the partition is dispatched, in order to reduce stalls due to decompression, thereby reducing the time needed to have the partition up and running. Alternatively, decompression may continue concurrently with the dispatch of the virtual processor. Concurrent decompression can be particularly useful in highly threaded designs, where some hardware threads are typically idle.

Figure 3:
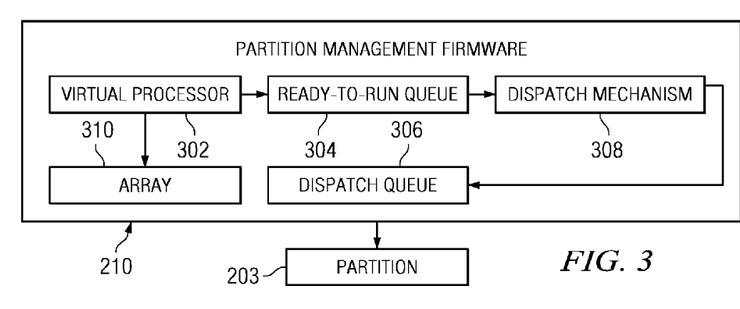
FIG. 3 is a block diagram comprising partition management components of FIG. 2 in accordance with illustrative embodiments.

With reference to FIG. 3 a block diagram comprising a subset of partition management components of FIG. 2 is shown. Partition management firmware 210 performs a number of functions and services for partition 203 by utilizing a variety of components including those of virtual processor 302, ready-to-run queue 304, dispatch queue 306, dispatch mechanism 308 and array 310 in accordance with illustrative embodiments.

Virtual processor 302 comprises the logical definitions for the processors that have been virtualized by partition management firmware 210. Ready-to-run queue 304 contains the list of tasks that are in line to be processed and ready. Dispatch queue 306 contains the list of tasks that are about to run as soon as dispatch mechanism 308 allows. Dispatch mechanism 308 contains functions that determine which tasks are dispatched into execution. Tasks to be dispatched are selected from the ready-to-run queue 304 by dispatch mechanism 306, analyzed and selectively placed on dispatch queue 308.

Partition management firmware 210 may be implemented through use of software. The software of the partition management firmware then works in combination with the hardware to provide and manage the environment of FIGS. 1 and 2. While partition 203 runs, pages of real memory, for example memory 240 of FIG. 2, may be allocated and used by partition 203 in the performance of its tasks. As partition 203 utilizes this memory, the hardware and the partition management firmware resolve the effective addresses of the pages of partition 203 with those of the real addresses of partitioned hardware 230. This page mapping is an integral function of the hardware and the partition management firmware.

Modern microprocessors employ high speed caches forming a page addressing buffer, such as translation look-a-side buffers (TLBs), as may be found in memory controller/cache 108 of FIG. 1, to provide effective page address to real page address translation. These high speed caches are highly optimized for system performance.

As addresses are translated in a translation look-a-side buffer, the addresses either hit in the translation look-a-side buffer or miss. If there is a miss, the addresses are resolved to a new effective page address to real page address mapping in hardware if the mapping exists. If the mapping does not exist, the partition management firmware 210 or the operating system of the partition may allocate a page mapping to resolve the translation miss. The real page address for each miss will be placed into an additional array, such as array 310. If the microprocessor supports multiple page sizes, the page size is also entered into the array 310 with the real address. As each new real page address is placed into the array 310, an old page address is displaced. This gives the array 310 the property of holding the most recently used (MRU) pages for the microprocessor.

When partition 203 that was dispatched and executing, becomes undispatched, due to an interrupt or waiting for another process such as input/output device delay, the partition management firmware 210 saves the values of the array 310 in a memory location specific to that virtual processor's state. The partition management firmware 210 should not record any addresses into the memory containing the array 310 that does not belong to the respective partition in which the particular virtual processor executes. This could be accomplished by either not recording addresses when running in partition management firmware state, by having the partition management firmware run in real address mode, thereby not using address translation mechanisms, or by reserving the memory for the specific purpose of page address tracking for the specific partition.

If the partition is no longer waiting on a resource it may then be placed in the ready to run queue 304. Dispatch mechanism 308 will then analyze and place on the dispatch queue 306 if the partition is ready for dispatch. Before the partition is to be redispatched to execute again, the partition management firmware begins to decompress the previously accessed pages recorded in array 310 as most recently used by the partition. The decompress function can occur before the partition 203 is dispatched, in order to reduce stalls due to decompression. Reduced stalls reduce the time needed to have the partition up and running. Alternatively, decompression may continue concurrently with the dispatch of the virtual processor. Concurrent decompression can be particularly useful in highly threaded designs, where some hardware threads are typically idle.

Figure 4:
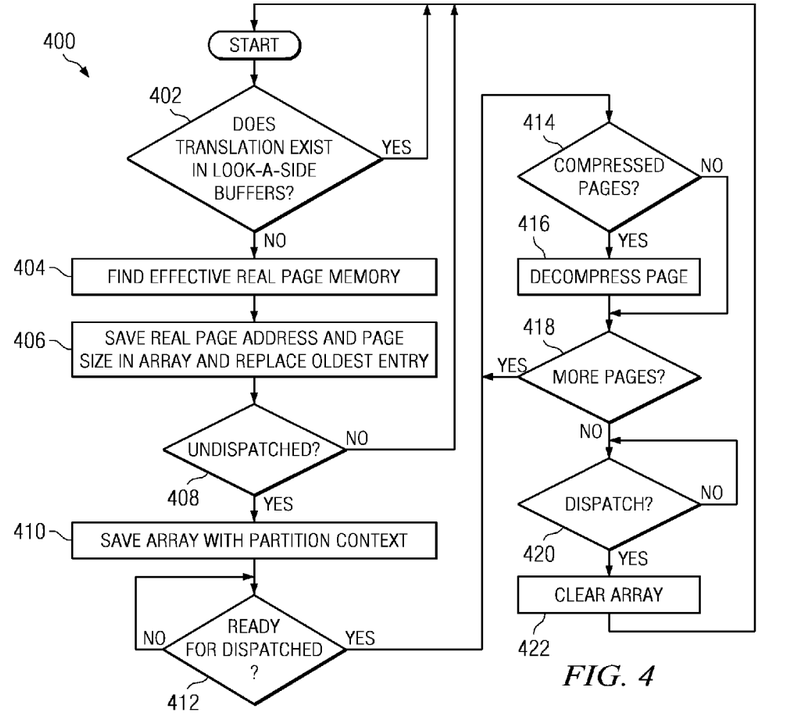
FIG. 4 is a flowchart of an exemplary process of partition management firmware of FIG. 2 in accordance with illustrative embodiments.

Turning to FIG. 4, a flowchart of an exemplary process of page tracking is shown in accordance with illustrative embodiments. Process 400 is implemented within and extends the current page address translation process of the partition management firmware software 210 of FIG. 2. Process 400 may be further viewed as a combination of information found in array 310, of FIG. 3, for page tracking, with the memory page processing of partition management firmware 210. The partition management firmware 210 provides a paging subsystem service to each of the defined partitions of logical partitioned platform 200 of FIG. 2.

Partition management firmware 210 functions in support of the logical partitions. An existing locator within the paging subsystem service capable of finding the effective page address to real page address mapping for a page address miss when it has been determined that there is a page address miss in a page addressing buffer contained within the memory is also used.

A storage module or area, such as memory 240-246 of FIG. 2, is used to store array 310, capable of saving the real page address and a page size combination as an entry in an array within the memory is also provided. The storage module or area may typically be managed by an existing storage device capable of writing data into a buffer or other suitable storage location defined for the task. The storage module or area should have performance characteristics suitable for maintaining the page addressing data with an affinity to the virtual processor or partition to which the data belongs as well as low latency for read and write time. Disk storage may provide the storage function, but may not meet the latency criteria; therefore, use of a high speed memory form is advisable.

A generator capable of creating a preserved array from the array 310 upon determining the dispatched virtual processor or partition to be an undispatched virtual processor or partition is typically a function of partition management firmware 210, capable of persisting data. Functions of partition management firmware 210 typically include capabilities to write data into a reserved area of a partition or firmware in the form of a control block or other well known controlled access storage.

An analyzer, such as that of the paging subsystem service of partition management firmware 210, is capable of analyzing each entry of the preserved array to find a compressed page, wherein, dispatch mechanism 308 of FIG. 3 has determined the undispatched partition ready for dispatching. Analysis may typically comprise a flag checking function used to determine if a flag indicating a compressed page is set, or a pattern recognition mechanism aware of the format of the compressed pages, or other means unique to the compression format of the compressed pages.

Partition management firmware 210 of FIG. 2 provides function executed on the processor to decompress a compressed page into the memory such as memory 240 and map it to a virtual address used by for example OS 202, thus making the decompressed page ready for use by the partition 203. The partition management firmware 210 typically provides function to detect a compressed page and may be used with page size information of the preserved array to decompress pages.

Process 400, of partition management firmware 210, starts during memory page address translation, wherein a determination is made with respect to a page address translation existing in the translation look-a-side buffers (step 402). If there is a page address hit then a "yes" in step 402, indicating there is no miss in the translation of the page address and process 400 returns to normal page address translation processing. If however, there is a "no" in step 402, then a translation look-a-side buffer miss has occurred meaning the effective page address to real page address mapping was not found. Process 400 moves to step 404 to find the required mapping.

In this case, the desired page address mapping was not found in translation look-a-side buffers; therefore, the required effective real page mapping must be found (step 404). The real page address, along with the respective page size, is then saved into the array. When performing a save into the array, the oldest real page address and page size combination is replaced with the newest real page address and page size combination (step 406).

The array is a high speed memory location reserved to contain the most recently used page address and page size combinations of a respective partition. The array functions as a page tracking mechanism of the partition's most recently used page addresses. Memory, such as memory 240 of FIG. 2 or NVRAM 298 of logical partitioned platform 200 of FIG. 2 or another form of accessible high speed memory may be used to accommodate the array of illustrated embodiments. NRAM 298 of FIG. 2 may be used to maintain paging information across power outages. Sizing of the array may be typically accomplished by observing partition activity and paging statistics.

A determination is made with respect to the dispatch status of the partition (step 408). When the partition is undispatched ("yes" to step 408), process 400 saves the array representing the most recently used addresses in a context area of the respective partition to create a preserved array (step 410). If, however, the partition is dispatched, ("no" to step 408), then process 400 reverts to normal memory page address translation as prior to step 402.

A determination is made with respect to the dispatch readiness of the partition (step 412). If the partition is not ready for dispatch "no" in step 412), process 400 will revert to perform step 412 again. If the partition is ready to be dispatched ("yes" to step 412), and before the partition is dispatched, for each page address and page size combination in the preserved array, a determination is made if the page is compressed (step 414).

If the page has been compressed, ("yes" to step 414), the page can be decompressed prior to use (step 416). If the page was not compressed and is ready to be used, ("no" to step 414), process 400 skips step 416 and moves to step 418 wherein a determination is made regarding the existence of more pages to be processed. If there are more pages to be processed ("yes" to step 418), process 400 reverts to step 414 to examine each page for its compress status. If there are no additional pages to be processed, ("no" to step 418), process 400 moves to determine if the partition is dispatched (step 420).

If the partition has not been dispatched, ("no" to step 420) process 400 will iterate in step 420. If the partition is dispatched, ("yes" to step 420), process 400 clears the entries of the preserved array (step 422). The most recently used entries of the array are cleared to avoid carrying state information from a previously running instance of the partition. Having cleared the array, process 400 reverts to normal page address translation processing as before at step 402.

Differing illustrative embodiments provide a number of features. Since only a subset of the pages used by the partition, in particular those most recently used and compressed, are decompressed; other compressed pages belonging to the partition will have to be decompressed after dispatching of the partition. During the normal course of execution, access of a compressed page results in a partition management firmware page fault. The page fault causes the partition management firmware to perform page decompression as part of the typical partition management service, which may be desired in a multithreaded well resourced situation.

The page tracking array typically aids in a more efficient restart of a previously suspended partition by indicating the most recently used pages, some of which may be compressed. Avoiding or reducing initial stalls due to page faults related to encountering a compressed page during the redispatch of the previously undispatched partition is achieved through use of the page tracking array information. The early identification and handling of the most recently used pages of the array compliments the partition management firmware virtual memory management function. By knowing which pages are needed initially to bring the partition back into operation, and knowing which of those pages are compressed allows the partition management firmware to more effectively The invention can take the form of an entirely hardware embodiment, an entirely software embodiment or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable recordable type medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a transmission medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for partition redispatching using page tracking, the computer implemented method comprising:
   detecting a page address miss in a page addressing buffer;
   finding an effective page address to real page address mapping for the page address miss to form a found real page address and page size combination;
   saving the found real page address and page size combination as an entry in a set of entries in an array;
   updating the set of entries in the array to track page use;
   creating a preserved array from the array in response to determining a partition is an undispatched partition, wherein address entries for only the undispatched partition are saved in the preserved array, wherein the partition is a subset of a data processing system's resources, and wherein an undispatched partition is a partition that is not presently executing;
   analyzing each entry of the preserved array for a compressed page responsive to determining that the undispatched partition is now redispatched; and
   decompressing a compressed page, responsive to determining the compressed page referenced by one of the set of entries in the array.

2. The computer implemented method of claim 1 wherein saving the real page address and page size combination further comprises:
   replacing an oldest entry in one of the set of entries of the array.

3. The computer implemented method of claim 1, wherein creating the preserved array further comprises:
   creating the preserved array by saving entries in the array for the undispatched partition in a memory location specific to the undispatched partition.

4. The computer implemented method of claim 1, wherein analyzing each entry of the preserved array for a compressed page further comprises:
- determining whether additional compressed pages are present; and
- responsive to a determination that additional compressed pages are present, invoking a partition management firmware function to decompress the additional compressed pages.

5. The computer implemented method of claim 1 further comprising:
- determining when the partition is dispatched; and
- responsive to the partition being dispatched, clearing the preserved array.

6. The computer implemented method of claim 1 wherein a content of the preserved array represents a predetermined number of most recently used pages of the dispatched partition.

7. The computer implemented method of claim 1 wherein decompressing the compressed page further comprises:
- decompressing the compressed page after the partition is undispatched and before the partition is redispatched.

8. The computer implemented method of claim 1 wherein the preserved array maintains an affinity unique to the partition.

9. A data processing system for partition redispatching using page tracking, the data processing system comprising:
- a bus;
- a storage device connected to the bus;
- a memory connected to the bus, wherein the memory includes computer usable program code; and
- a processor connected to the bus, wherein the processor unit executes the computer usable program code to create:
  - a locator responsive to detecting a page address miss in a page addressing buffer, capable of finding an effective page address to real page address mapping for the page address miss to form a found real page address and page size combination;
  - a storage module on the storage device capable of saving the found real page address and page size combination as an entry in set of entries in an array, and updating the set of entries in the array to track page use;
  - a generator capable of creating a preserved array from the array in response to determining a partition to be an undispatched partition, wherein address entries for only the undispatched partition are saved in the preserved array, wherein the partition is a subset of a data processing system's resources, and wherein an undispatched partition is a partition that is not presently executing;
  - an analyzer capable of analyzing each entry of the preserved array for a compressed page responsive to determining that the undispatched partition is redispatched; and
  - a partition management firmware function to decompress a compressed page responsive to determining the compressed page is referenced by one of the set of entries in the array.

10. The data processing system of claim 9 wherein the storage module capable of saving the found real page address and page size combination further comprises:
- a capability for replacing an oldest entry in one of the set of entries of the array.

11. The data processing system of claim 9 wherein the generator capable of creating the preserved array further comprises:
- a capability of creating the preserved array by saving entries in the array for the undispatched partition in a memory location specific to the undispatched partition.

12. The data processing system of claim 9 wherein the analyzer capable of analyzing each entry of the preserved array for a compressed page further comprises:
- a capability for determining additional compressed pages and, when found, invoking the partition management firmware function to decompress the additional compressed pages.

13. The data processing system of claim 9 wherein the analyzer further comprises:
- a capability for determining when the partition is dispatched and invoking the partition management firmware function to clear the preserved array.

14. The data processing system of claim 9 wherein the partition management firmware function to decompress the compressed page further comprises:
- the partition management firmware function to decompress the compressed page after the Partition is undispatched and before the partition is redispatched.

15. The data processing system of claim 9 wherein the preserved array maintains an affinity unique to the partition.

16. A computer program product for partition redispatching using page tracking, the computer program product comprising computer usable program code tangibly embodied on a computer readable storage medium; the computer usable program code comprising:
- computer usable program code for detecting a page address miss in a page addressing buffer;
- computer usable program code for finding an effective page address to real page address mapping for the page address miss to form a found real page address and page size combination;
- computer usable program code for saving the found real page address and page size combination as an entry in a set of entries in an array;
- computer usable program code for updating the set of entries in the array to track page use;
- computer usable program code for creating a preserved array from the array in response to determining a partition is an undispatched partition, wherein address entries for only the undispatched partition are saved in the preserved array, wherein the partition is a subset of a data; processing system's resources, and wherein an undispatched partition is a partition that is not presently executing:
- computer usable program code for analyzing each entry of the preserved array for a compressed page responsive to determining that the undispatched partition is now redispatched; and
- computer usable program code for decompressing a compressed page, responsive to determining the compressed page is referenced by one of the set of entries in the array.

17. The computer program product of claim 16, wherein computer usable program code for saving the found real page address and page size combination as an entry in a set of entries in an array further comprises:
- computer usable program code for replacing an oldest entry in one of the set of entries of the array; and
- wherein computer usable program code for creating the preserved array further comprises computer usable program code for creating the preserved array by saving entries in the array for the undispatched partition in a memory location specific to the undispatched partition.

18. The computer program product of claim 16, wherein computer usable program code for analyzing each entry of the preserved array for a compressed page further comprises:
  computer usable program code for determining whether additional compressed pages are present; and
  computer usable program code responsive to a determination that additional compressed pages are present, for invoking a partition management firmware function to decompress the additional compressed pages.

19. The computer program product of claim 16 wherein computer usable program code for determining when the partition is dispatched further comprises:
  computer usable program code responsive to the partition being dispatched, for clearing the preserved array, of a content representing a predetermined number of most recently used pages of the dispatched partition.

20. The computer program product of claim 16, wherein decompressing the compressed page further comprises:
  decompressing the compressed page after the partition is undispatched and before the partition is redispatched.

* * * * *